US009990723B2

(12) United States Patent
Van Leeuwen et al.

(10) Patent No.: US 9,990,723 B2
(45) Date of Patent: Jun. 5, 2018

(54) IMAGE BASED ROI TRACKING FOR MDX

(71) Applicant: KONINKLIJKE PHILIPS N.V., Eindhoven (NL)

(72) Inventors: Marinus Bastiaan Van Leeuwen, Eindhoven (NL); Jelte Peter Vink, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 81 days.

(21) Appl. No.: 15/029,651

(22) PCT Filed: Sep. 30, 2014

(86) PCT No.: PCT/EP2014/070841
§ 371 (c)(1),
(2) Date: Apr. 15, 2016

(87) PCT Pub. No.: WO2015/055412
PCT Pub. Date: Apr. 23, 2015

(65) Prior Publication Data
US 2016/0267656 A1  Sep. 15, 2016

(30) Foreign Application Priority Data
Oct. 18, 2013 (EP) .................... 13189300

(51) Int. Cl.
*G06K 9/00* (2006.01)
*G06T 7/00* (2017.01)
(52) U.S. Cl.
CPC .......... *G06T 7/0016* (2013.01); *G06T 7/0014* (2013.01); *G06T 2207/10056* (2013.01);
(Continued)

(58) Field of Classification Search
CPC . G06T 2207/10056; G06T 2207/10148; G06T 2207/20104; G06T 2207/30024; G06T 7/0014; G06T 7/0016
See application file for complete search history.

(56) References Cited

U.S. PATENT DOCUMENTS

| 8,241,573 B2* | 8/2012 | Banerjee | ............. C12Q 1/6869 |
| | | | 382/128 |
| 2006/0159325 A1* | 7/2006 | Zeineh | ............... G06F 19/3443 |
| | | | 382/128 |

(Continued)

FOREIGN PATENT DOCUMENTS

WO   2010125495 A2   11/2010

OTHER PUBLICATIONS

Lowe, D. "Distinctive Image Features from Scale-Invariant Keypoints", International Journal of Computer Vision, vol. 60, No. 2, 2004, pp. 91-110.

(Continued)

*Primary Examiner* — Bhavesh Mehta
*Assistant Examiner* — Ian Lemieux

(57) ABSTRACT

An apparatus (MDS) and related method for image processing. The apparatus includes a multi-modal matcher (M). The matcher (M) operates to match a first reference (RF1) image against a stream (LF) of image frames (F1, F2). Once a match is found, the current reference image (RF1) is exchanged for a matching frame from the stream. The matcher (M) then attempts matching against subsequent frames in the stream by now using said matched frame as a new reference image. Once a further frame (Fm) is found that matches said new reference image, said further frame (Fm) is output as a best match.

14 Claims, 2 Drawing Sheets

(52) U.S. Cl.
CPC .............. *G06T 2207/10148* (2013.01); *G06T 2207/20104* (2013.01); *G06T 2207/30024* (2013.01)

(56) References Cited

U.S. PATENT DOCUMENTS

| | | | |
|---|---|---|---|
| 2008/0219529 A1* | 9/2008 | Alexandrov | G06K 9/6228 382/128 |
| 2009/0041329 A1* | 2/2009 | Nordell | G06F 19/321 382/134 |
| 2011/0194739 A1 | 8/2011 | Vincent | |
| 2012/0033861 A1 | 2/2012 | Dai | |
| 2012/0070089 A1* | 3/2012 | Yamada | G06K 9/6255 382/209 |
| 2012/0072452 A1* | 3/2012 | Stratman | G06Q 10/06 707/772 |
| 2012/0207367 A1 | 8/2012 | Kneepkens | |

OTHER PUBLICATIONS

Mueller, D. et al "Real-Time Deformable Registration of Multi-Modal Whole Slides for Digital Pathology", Computerized Medical Imaging and Graphics, vol. 35, 2011, pp. 542-556.
Green, Isaac A. et al "Propagating Segmented Regions during a Camera Saccade", Pattern Recognition, vol. 1, 2004, pp. 640-643.
Burschka, Darius et al "Scale-Invariant Registration of Monocular Endoscopic Images to CT-Scans for Slnue Surgery", Medical Image Analysis, vol. 9, 2005, pp. 413-426.

\* cited by examiner

IMAGE BASED ROI TRACKING FOR MDX

CROSS-REFERENCE TO PRIOR APPLICATIONS

This application is the U.S. National Phase application under 35 U.S.C. § 371 of International Application No. PCT/EP2014/070841, filed on Sep. 30, 2014, which claims the benefit of European Patent Application No. 13189300.0, filed on Oct. 18, 2013. These applications are hereby incorporated by reference herein.

FIELD OF THE INVENTION

The present invention relates to an image processing apparatus, to a method of image processing, to a computer program element and to a computer readable medium.

BACKGROUND OF THE INVENTION

In pathology, classification of tissue into normal type and tumor type can be challenging at times and requires detailed analysis of the fine structures of the cells and their morphology.

In traditional cancer diagnosis, (histo-)pathological images of biopsy samples are visually analyzed by pathologists. Next to this, also molecular methods (e.g., polymerase chain reaction (PCR) or sequencing) are used to identify biological characteristics of (tumor) tissue. Because the result of a molecular analysis heavily depends on the exact composition of the selected tissue region, a precise Region-of-Interest (ROI)-dissection is required. Currently, the ROI is often manually dissected using a scalpel, which is (highly) inaccurate. "Digital pathology" pursues the route of using image analysis algorithms that can be used to search for the ROI tissue. It has been found however that existing algorithms are, at times, slow or lack robustness.

WO 2010/125495 A2 disclosed that generate a first digital image of a first slice which comprises a region of interest, generate a second digital image of a second slice, and determine a region of interest in the second digital image on the basis of the region of interest in the first digital image, wherein the first digital image serves as the reference template.

SUMMARY OF THE INVENTION

There may therefore be a need for alternative apparatus or related method to match images. The object of the present invention is solved by the subject matter of the independent claims where further embodiments are incorporated in the dependent claims. It should be noted that the following described aspects of the invention equally apply to the apparatus, to the image processing method, to the computer program element and to the computer readable medium.

According to a first aspect of the invention there is provided an image processing apparatus for use in biology, histology and pathology, comprising:
  an input port for receiving a stream of image frames from a first imaging modality;
  an image matcher switchable between two modes. The matcher is configured to attempt matching the image frames from a second imaging modality against a first image, wherein the first image serves as a first reference (image) template when the matcher operates in the first mode. The matcher, in the first mode, once a first matching frame is found from among the frames in the stream of frames or once a user issued switch signal is received, operates to switch over into the second mode to now use the first matching frame or a current frame as a second reference (image) template instead of the first reference template to attempt matching (image frames) in the stream of frame against said second reference template;
  an output port configured to output a further matching frame once said further matching frame is found by the image matcher.

In other words, the image processor as proposed herein helps reduce the computational effort in a "cross matching" tasks where the first reference image with its own image characteristics needs to be matched to frames that have characteristics from the reference image characteristics. In one embodiment, the first reference image on the one hand and the frames in the stream on the other, encode, at times, markedly different image information so they have in particular, at times, a markedly different visual appearance from another when displayed. This difference may be caused by the fact that the reference image and the frames were acquired by different imaging modalities and/or by the fact that the reference image and the frames encode image information of different objects and/or of objects that have undergone different treatments such as dyeing etc. before the reference and the frames were acquired of the object(s).

To better cope with those different image characteristics, the apparatus as proposed herein operates to exchange the first reference template for a template computed from the matching frame once the match between the first reference template and said frame is detected. Because of this exchange, the proposed image processor is highly responsiveness in finding, in particular, subsequent matches in the stream. Because of this template exchange, an otherwise complex and computationally expensive matching problem is simplified. In general, the time between two subsequent in-stream matches of frames can be expected to be less than the time it took to match the "out of stream" reference image "into the stream", that is, to the frame. The speed-up comes about because, after the first match, the matcher deals with matching more similar images with each other, namely the frames of the stream taken of the same object. Furthermore, robustness and reliability of the matching process increases for matching more similar images.

In one embodiment, the image processing apparatus is used for recognition of an object, which should be analyzed in a first histological sample at a first moment in time and in a second different histological sample at a later moment in time. In one embodiment, the samples are of cancerous pieces of tissue (OI), which is analyzed in a first tissue sample put on a microscope slide with a glass cover ("cover slip"), and the same piece of tissue, which is to be dissected (extracted, isolated) from a second tissue sample, is extracted from a same block of paraffin and put on a microscope slide but without a cover slip. Both slides are then imaged, for instance the one with cover slip is imaged using a pathology scanner or similar, whereas the other, "without-cover-slip" slide, is placed under a (in one embodiment, electronic) microscope and images are captured to produce the frames. This histological procedure causes a level of dissimilarity between the images/frames (taken of the slides) that appears to violate the assumptions of most standard image matching strategies. For instance, the presence (or not) of the cover glass may cause different optical paths due to spherical aberration and refraction phenomena.

Therefore, in this exemplary histological context, the matcher operates to first attempt matching a first OI by a comparison of detected features in each frame with the first template derived from the reference image of the slide with the cover slip. A second computerized template is then derived from the frame first matched to the OI. Thereafter the matcher operates to attempt matching each new OI by a comparison of detected features in subsequent frames with said (new) second template. This allows saving computation time because the template or "model", which is used for recognizing the OIs in the second sample, has been derived/built on the basis of an OI in the same sample. Accordingly, some or most matching problems that are due to the differences, e.g. in appearance caused by the procedure of placing sections of the sample on two different slides (with and without cover slip, respectively), are overcome. As a result, the performance of the matching process will improve in terms of robustness, accuracy, and throughput time by reducing computational complexity.

The switch-over, that is the exchange of the current template for the frame-based template, occurs in one embodiment automatically but there are also manual embodiments envisaged herein.

In the embodiment, where the switch-over occurs automatically, matcher operates to evaluate image features of the frames against the master image template and uses a metric to compute a score that measures the level of correspondence between the two images at a certain image portion. Said score is compared against a pre-defined or user definable threshold. If the score exceeds said threshold, the frame is considered to match the reference image. Otherwise, if the score remains below said threshold, the frame is considered not to match the reference image. The same metric/score approach is then taken when matching frames against each other after the switchover occurred.

In the embodiment with manual switching, the user issues the switching signal via suitable input means (such as keyboard or pointer tool such as mouse etc.). When used in combination with the previously mentioned embodiment with the automatic switching, the option to issue a user signal to trigger the switch-over effectively furnishes the user with an "overriding facility": the user can "declare" a current frame to form the basis for the new template and may so "trump" the metric evaluation of the image features in the current frame. "Current frame" refers in this context to a frame in the stream, which the matcher is currently attempting to match, and/or is the image frame that is currently displayed on a display unit, such as a monitor or (computer) screen.

According to one embodiment, the match operation is based on attempting to match an image feature in the first or second reference as defined by the template against an image portion in the respective image frames. In one embodiment, the template of the first reference image is derived or computed from image features previously annotated or identified either automatically or by a human medical expert. In the reference image, the image features (expressed by the template) capture the image information of a region of interest (ROI), for example the cancerous part in the tissue sample. Accordingly, a "match" as used herein may be taken as an indication that the image portion in the frame forms a "counterpart ROI" of said annotated ROI. In other words, the counterpart ROI in the frame is a representation in that frame of the cancerous part as captured in the ROI of the first reference image. The matching operation is based in one embodiment on the Scale-invariant feature transform (SIFT).

According to one embodiment, the outputting includes displaying on a display unit the image portions of, respectively, the further or subsequent matching image frames, with a respective graphical overlay outlining the respective image portions. In one embodiment, the overlay is displayed in a color or hue different from the background of the respective image portions in the respective matching frame. This improves the ergonomics. Also, because of the increased responsiveness of the proposed image processing apparatus caused by the changeover as explained above, the graphical overlay can be supplied in essentially real time with the frame rate of the image stream.

According to one embodiment, the outputting includes displaying on a display unit the further image frame, wherein the first matching frame is not displayed, but it is only the further matching frame or any subsequent matches (that is, matching frames) from the stream that are (preferably sequentially) displayed on the display unit. This improves ergonomics because the user focus is directed to the in-stream matches that are likely to form better matches than the first "entry" match. In an alternative embodiment, or, if the user so requests, it is also the first matching frame that is displayed on the display unit.

According to one embodiment, the second reference template is maintained for any (or one or more) further matches until an imaging setting of the first imaging modality is changed. The matcher, in response to such a change, then operates to again switch over and to use, as a third reference template, a second further frame in the stream that is found by the matcher to match the current, second reference template. In other words, after the occurrence of the change of imaging stetting, it is the third reference template that is used instead of the previous (second reference) template for future in-stream matching attempts. For instance, in one embodiment the imager is a microscope device and the setting is defined by the focal distance or plane. Changing focal distance or changing focal plane may again introduce a difference in visual appearance among the frames acquired before and after the change of the imaging settings. This change of visual appearance can be accounted for by again switching over and exchanging the current template for an updated one (that is, the third reference template) to make the matching task easier as has been done before by changing over from the "non-frame" first reference image to a frame-derived-template (the second reference template) from the image stream.

According to one embodiment, image coordinates of the further or subsequent matching frames are fed into an MDx (Molecular Diagnostics) apparatus to remove material from the second section that corresponds to the region of interest as recorded in the further or subsequent matching frames. In other words, image coordinates of the counterpart ROI (that is, the ROI (as recorded in the frame) that corresponds to the ROI as recorded in the first image) are used to control a dissection operation.

According to one embodiment, the stream is supplied manually or automatically. One embodiment of the manual stream supply is when the user "pans" the slide under a microscope to so generate the image stream. In the "automatic" stream supply embodiment, the microscope may be fitted with an automatic scanner facility. The microscope's stage (on which the second slide is deposited) is motorized and moves about in a scan pattern whilst the frames are acquired thus producing the image stream ("live feed") at about 15 frames per second or more.

Although the proposed apparatus has been explained herein with reference to digital pathology or digital molecular pathology, other usages are likewise envisaged herein. Also it is understood that the reference image and the frames are not necessarily pathology slides and the imaging modalities are not necessarily a microscope camera system and pathology slide scanner, respectively. Other camera or scanner systems with possibly lower resolution capabilities that are still adequate for the imaging task at hand are also envisaged herein. For instance, in another embodiment, the reference image is an angiogram and the stream of frames is a sequence of fluoroscopy images. In yet another, non-medical embodiment, the reference image may have been acquired with a digital camera whereas the frames are recorded by a video camera. The proposed apparatus then allows finding the photographed object in stream of motion picture frames.

Definitions

"Stream of frames" or "image stream" or "(live-)feed" are used interchangeably herein and relate to a temporal sequence of images (referred to as "frames").

"Reception of the stream" may not necessarily mean that all frames of the stream are received at the same time, but frames may also be received sequentially and it is also understood that it is not necessary each and every frame in the stream that received and/or processed by the image processor as proposed herein. For instance some frames may be dropped for whatever reason.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
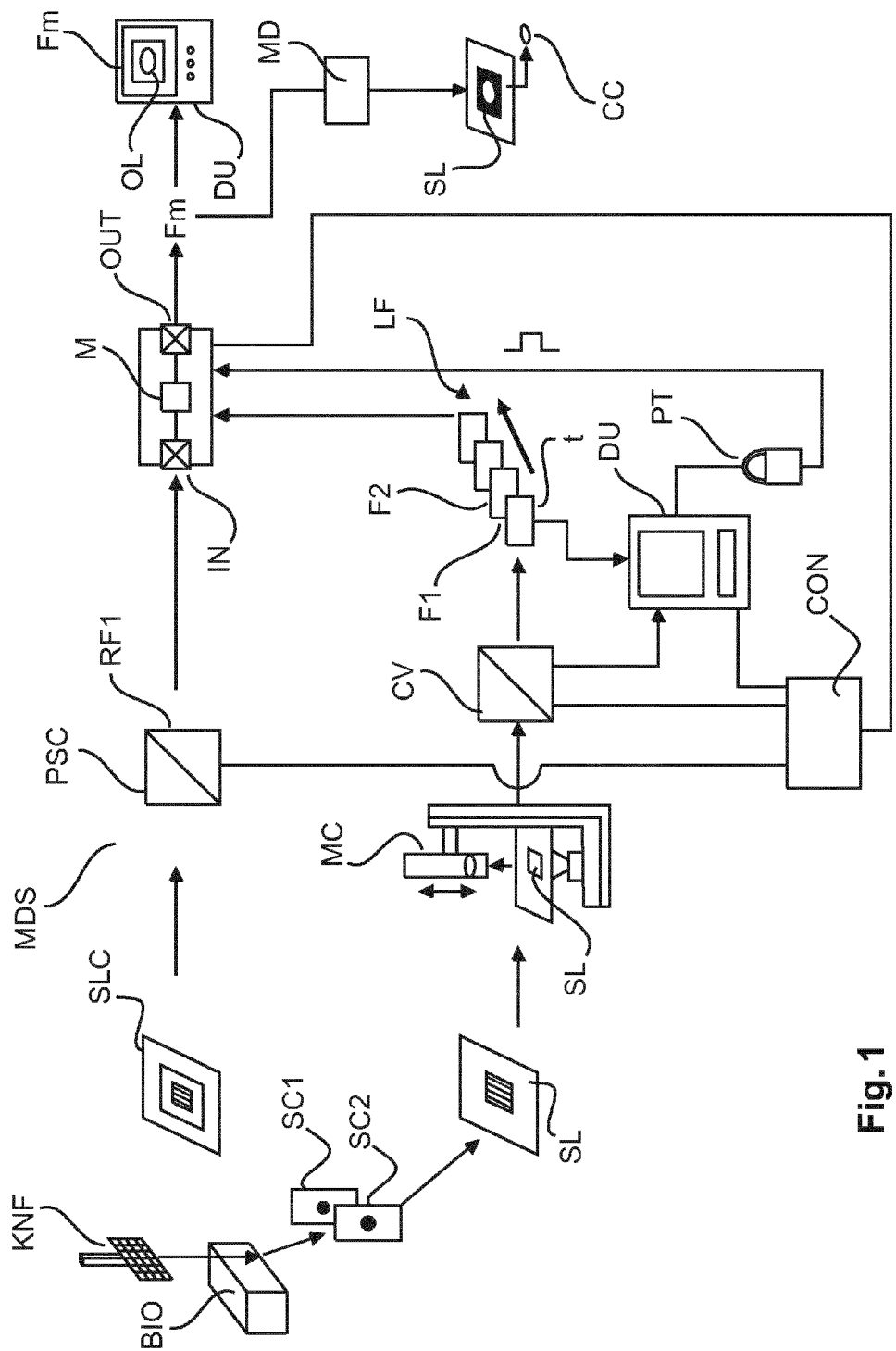
FIG. 1 shows an image processing arrangement.

With reference to FIG. 1, there is shown a schematic block diagram of an arrangement MDS for computer aided molecular diagnostic dissection (MDx). The arrangement operates on digitalized images of tissue. In MDx it is an objective to identify and to isolate tissue of interest (such as cancerous tissue) from a sample. There is usually a high requirement for purity of the isolated tissue of interest. FIG. 1 shows how this can be done.

In an initial procedure, a sample specimen BIO of tissue is treated with formalin and is then embedded in paraffin. This procedure (also referred to as FFPE) allows to preserve the molecular structure and to solidify tissue specimen. Using a histological cutter KNF such as a microtome or similar, two or more sections SC1,2 of the so treated tissue are then taken. One of the sections, say SC1 ("the master section") is then dyed using Hematoxylin & Eosin (H&E). The dyed or stained tissue is then mounted between a standard glass slide and a cover slip (a piece of glass, thinner than the supporting glass slide) to form a microscopic master slide SLC. Using a microscope MC, the master slide is analyzed for morphology and staining patterns of the tissue to identify and then annotate a region-of-interest (ROI) that corresponds to the cancerous part of the tissue. Thanks to the H&E staining, there is a good contrast between the nuclei and their surrounding cytoplasm. Also, the application of the cover slip on top of the treated tissue enables better visualization of small details in tissue morphology and cell texture.

The master slide as used herein is intended for future safekeeping because of medical or legal reasons. Again, the cover slip helps preserving the "optical" details and prevents (or at least slows down) degradation of the section. In other words, and as should be clear from the above, the master tissue SC1 is not available to actually, that is, physically, isolate the cancerous tissue. This is where the second section SC2 plays in.

Said second section SC2, is prepared similarly to the first master section SC1, but second section SC2 is typically only stained with Hematoxylin and is mounted on a separate, different glass slide, but this time without a cover slip to form a further, but this time "open" slide SL. The morphology of the second section SC2 can be expected to only very roughly match the morphology of the first section SC1.

The essential task in MDx is now an exercise in "re-finding", in the second slide, the previously annotated region of interest as per master slide. However, as it will be appreciated from the above procedure, the digital slides are likely to be markedly different in visual appearance. First of all the two slices, although taken from the same tissue specimen, will still include different parts of the cancerous tissue. Secondly, the slicing or cutting operation to sever the two sections SC1, SC2 from the biopsy sample BIO, may cause different amounts of stretching, compressing or even "folding over" parts of the tissue sections when placing the sections on their respective slides. Third, the two sections have been dyed differently. Also, the impact of the cover slip tends to change the optical paths differently when imaging the slides, thus further disfiguring the assumed structural similarity of the cancerous tissue in the two sections.

It is therefore proposed herein a digital image processing arrangement that aids the user in this task of re-finding or re-identifying corresponding image structures in images that have, at times, a markedly different visual appearance in different images.

More particularly, the digital image processing arrangement includes an image processor IP (whose operation will be explained in more detail below) that takes at its input IN digitalized versions of i) the master slide SLC and ii) of a live feed of different views ("frames") of the second slide SL. The image processor IP then operates thereon, via matcher M, to produce at output OUT a frame of "best match" Fm that encodes "counterpart image information" that corresponds to the ROI as annotated in master slide SLC. The frame Fm may then be used to isolate tissue that corresponds to the ROI in the reference image RF1 as will be explained in more detail below. According to one embodiment, the digital version of master slide SLC is formed by operation of the digital slide scanner PSC. Slide scanner PSC outputs a digital image RF1 ("first reference image") of master slide SLC.

The second slide SL is examined by operation of a microscope whose optical output is coupled to a digital conversion stage CV to convert optical information into one or more digital images or "frames". The microscope is operated either automatically by following an automatic scanning protocol or is operated manually by the user to basically scan the slide SL by "panning" operations and or magnification operations (by changing the microscope's focal plane or distance and/or changing lenses, etc), to so generate a life feed LF or stream of individual consecutive frames F1-F3 of the digital imagery. In other words, each frame shows, in general, different portions of the slide SL or shows the same portion at different magnification levels. The frames can be observed on a display unit DU such as a monitor as they are generated. The manner, in which image processor IP operates to find the best match frame Fm from the image stream LF, will now be explained in more detail below.

Operation

The image processor IP as proposed herein implements in one embodiment an image registration algorithm based on image object recognition.

Initially, the first reference image RF1 of the master slide is scanned to compute image features for recognition in said reference image RF1. Examples of images features for recognition are SIFT features, Harris corner features, edge/contour features, Histogram of Gradient (HOG) features, or (normalized) gray level features. The reference image features may then be stored as a "model" or template of features in a memory, for instance RAM of a computing unit or the unit's hard drive or is stored externally on a disk or other external media for future reference.

The image processor then reads in the microscopic live feed LF and computes image features of each frame Fi of the feed as the frames are received at the input IN. Each frame Fi is a capture of a current field of view of the microscope MC that shows features of the second slice SC2.

The image processor IP then attempts to match the computed features of the master image (that is, the template) against the computed features for each frame Fi. The match is based on a metric to measure the level or degree of correspondence between master template and the features in the respective frames of the feed or stream LF.

In one embodiment, the image matching algorithm used by matcher M to achieve the template-frame matching, is based on the Scale-invariant feature transform SIFT as described by D. Lowe in "Distinctive Image Features from Scale-Invariant Keypoints", International Journal of Computer Vision, 60, 2, pp. 91-110, 2004. However, it is understood herein that other image matching or object recognition based image registration algorithm may likewise be used with benefit herein. For instance, another example for a suitable algorithm, as used herein, in one embodiment is furnished by D. Mueller et al in "Real-time deformable registration of multi-modal whole slides for digital pathology", Computerized Medical Imaging and Graphics, Vol. 35, 2011, pp. 542-556.

The metric in either of these algorithms is a means to quantify the degree of correspondence and is typically based on the matching quality of feature correspondences and the total number of feature correspondences that agree with the geometry underlying the feature locations in the template. For instance, in SIFT, the template is defined by a feature vector that summarizes gradient behavior (taken with respect to pixel intensities) or scaling behavior of the respective images when put through a series of filters (such as convolution, band pass filter, low pass filter etc). The Euclidean distance or other distance measure between the feature vectors of the two images then defines a "score" (after suitable normalization). If this score is less than, say, 0.8, there is no match. If said score is at least 0.8, there is a match. Another form of "template" for matching purposes as used herein is to define a suitable family of parameterized transformations that profess to transform one image to another. The parameters are then fitted to the two images at hand, and are then evaluated by a cost function to define the score. For instance, the lower the cost, the higher the score, etc. However, existing algorithms such as SIFT generally assume a relatively high level of correspondences between the images. For instance, geometric deformations are usually assumed to be limited to variations in orientation and scale only, and perhaps allow for very small variation in perspective deformation as in SIFT. The rationale underlying those constraints is that SIFT and similar algorithms are based on similar "visual appearance" and therefore work best if the variation in appearance is limited, or is accounted for by adequate model assumptions. However, those assumptions do not normally hold up in the present pathological context: the number of useful feature correspondences between the frame and the master image are fairly low. This may be caused by the different dying treatment (H&E on the one hand, and, H only on the other), and/or the modification of the optical path due to the presence of the cover slip in the master image and others.

In order to address this issue of heterogeneous visual appearance between the master image and the frames, it is proposed herein to have the image processor IP operate in a multi-mode, that is, in at least two modes. In a first, "out of feed" mode, the matcher M attempts as previously described to match the template, computed from the master image RF1, against the frames of the microscopic image feed. But once the metric evaluation indicates that there is a match at the required level, a "switch-over" into "inside feed" mode occurs. When in the "inside feed" mode, the initial template as per master slide is abandoned in favor of the computed image features in the current, just found, matched-up frame, which now becomes the new template against which subsequent frames will be matched. In other words, an initial extra stream matching changes into an intra-stream matching: a "cross" matching operation that attempts to match frames "outside the stream", that is, against the initial master image (which is not one of the frames) changes over to a matching operation that seeks to match up frames within or inside the stream or feed. In yet other words, if, in the previous, master image versus frame matching, it is found (by evaluation of the correspondence metric) that the sought after region of interest (as demarked in the master image) is fully or partially present in the field of view as per a current frame Fi, the matcher M abandons the current "search strategy" and the search strategy is now based instead on a new template re-computed from the current frame from the microscopic live feed, that was found to match the template of the master image. From this instance onward, the new frame based template is used by image processor IP for detection of the region of interest in the microscopic image feed.

The matcher M now operates in the second, "in feed" mode. That is, the matcher M now attempts to match against frames in the feed, by evaluating for each received frame level the correspondence metric in respect of the new template. If the metric evaluation reveals that a correspondence between new template and a further frame from the feed exceeds a certain pre-defined threshold, an "intra match" is now found and this new match is now considered an instance of the sought after frame of best match Fm. The matcher M then instructs a graphical rendering backend to generate a graphical indicator such as a graphical overlay OL that is overlaid on the best match frame. The graphical overlay OL then indicates the counterpart region of interest that returned a level of correspondence that exceeds the predefined threshold. Said frame of best match Fm is then rendered for display and is then displayed on the display unit DU. In this manner the overlay OL serves as a visual means of notification for the user that the registration problem has been solved with respect to a current field of view as shown by the best match frame Fm. In other words, the fact that Fm is a matching frame may be interpreted that a location, namely the counterpart ROI, in the frame Fm has been identified that corresponds to the ROI location in the master image. Therefore, if a match is found for the field of view (as per the current, matching frame Fm) with the ROI as marked up in the reference image RF1, this means that the image seen in the field of view of the current frame corresponds to the target location of the reference image RF1. It is then assumed that the location or "course" of the border of the counterpart ROI (in both images) is the same (or nearly so) and one can then visualize the location/course of the border of the counterpart ROI in the matching frame by overlaying, onto the frame Fm, the graphical overlay OL at the counterpart ROI in the field of view.

Other forms of visual notification, such as changing the color of the border portion of the frame or similar visual effects, can be used to notify the user that an in-feed frame match has been found. Audio notification is also envisaged herein either instead of or in combination with visual notification. An event handler of the matcher M then checks whether a new frame from the feed has been received at input port and, if yes, the previous computations, as explained above, are repeated to now evaluate the level of correspondence with the current template in respect of said subsequent frame. It is envisaged herein that the reference frame template first found remains the reference template for further in-feed-matching. However, variations on this theme are also envisaged, in which a further changeover occurs and the currently held frame template is abandoned in favor of a new frame template, e.g. in case a newly found frame at hand has yet a better overlap (that is, matches better) with the targeted ROI. This second changeover is, in one embodiment, triggered by the user or after automatic changing of the imaging settings of the microscope MC that supplies the microscopic image feed. For instance, in one embodiment, if the user or scanning protocol changes the magnification (that is, changes the focus plane or distance or switches lenses, etc), a corresponding system call is issued by a controller interface in the microscope's circuitry and is then forwarded to the matcher M. A corresponding event handler then intercepts the focal plane change event whereupon the matcher M operates to replace the current frame template for a new template, once a next matching frame in respect of the current template has been found.

As will be appreciated from the above, because of the described changeover capability of the matcher from an out-of-stream matching against the first reference image to a matching "within" frames of the stream, the object recognition problem becomes much easier to solve as the new frame based template (that is, the one found after the first switchover) is more similar in visual appearance to the target ROI as provided by the microscope. The initial template, that is not based on a frame of the second slide SL, but is based on the reference image RF1 (so is an image of the first slide SLC), may exhibit a range of differences over the image data in frames as captured by the microscopic feed from the data obtained by the microscope. Said differences may be caused by different orientations, scale, shape, illumination, staining, and the general appearance due to differences in the image formation. With these differences between the master image and the frames in the live feed sidestepped by the changeover, the matching process becomes much easier. As a result, the performance of the matching process will improve in terms of robustness, accuracy, and throughput time because the computational complexity has been reduced. In particular, the user experience will greatly benefit from the improved robustness and higher throughput. The lower computational complexity of the algorithm as proposed herein, enables real-time performance using even less advanced (e.g. low cost or mobile) computer platforms.

As will be appreciated from the above, the signal to initiate the switchover, in particular the first switchover from the master image to the frame based template, was initiated by using signals generated by the execution of the matching algorithm. In particular, the switching signal was linked to the level of correspondence between the frames and the master templates on the one hand or was linked to the level of correspondence among the frames in case the changeover occurs in response to changes in the microscope system's imaging settings. In other words, in those embodiments, the template exchange occurs automatically, that is, decisions of the user have no role to play. However, in other embodiment, the user is provided with an "override" functionality, in which it is a user issued signal that determines whether an exchange of the current template for a new, updated template is to occur. In this embodiment, the matcher M has a suitably configured event handler that listens for user issued signals, such as pointer tools PT event (mouse click, etc.), or touchscreen events. In those embodiments, it is envisaged that the user clicks or touches, or otherwise issues a signal if he or she believes a current frame (for instance, as displayed on screen DU) includes a representation of the sought after counterpart region of interest and hence should be used as a basis for the template in place of the currently held one. The matcher then suspends computation of the level of correspondence, but computes the image features of the currently user chosen frame and uses those as the template for future matching operations. In one embodiment, the matcher may still complete computing the level of correspondence and is configured to display a numerical value or may indicate by color coding or otherwise, the current level of correspondence so as to furnish the user with a basis for a decision on whether he or she wishes to adopt the currently viewed image features as a template. The user has now the option by mouse-click or otherwise to reconsider the choice, in which case the currently viewed frame is still not made a basis for the new template, but the currently held template is retained. Otherwise the user issues an "accept" signal and the template based in the current image is adopted and is then used for subsequent matching attempts.

It is also appreciated herein, that the reduced computational complexity that is caused by exchanging the master image based template for a frame based template will result in an increased frame rate and increased robustness and accuracy of the image recognition. An effect of the template exchange is that, in general, there will be a drop in recognition time between the time it takes to match, initially, the master image to a frame, as compared to the time it takes to match the exchanged frame template to the frames in the feed.

Based on the matched ROI, the images (that is, the master image RF1 and its matching frame) can be registered (that is aligned in a common coordinate system) to determine image coordinates of the counterpart ROI in said best-match frame Fm. The so determined image coordinates of the ROI, can be then used to control operation of a microscopic dissector MD, to isolate cancerous tissue CC. Said coordinates may also be used for manual removal of CC by a lancet or some scraping tool.

Figure 2:
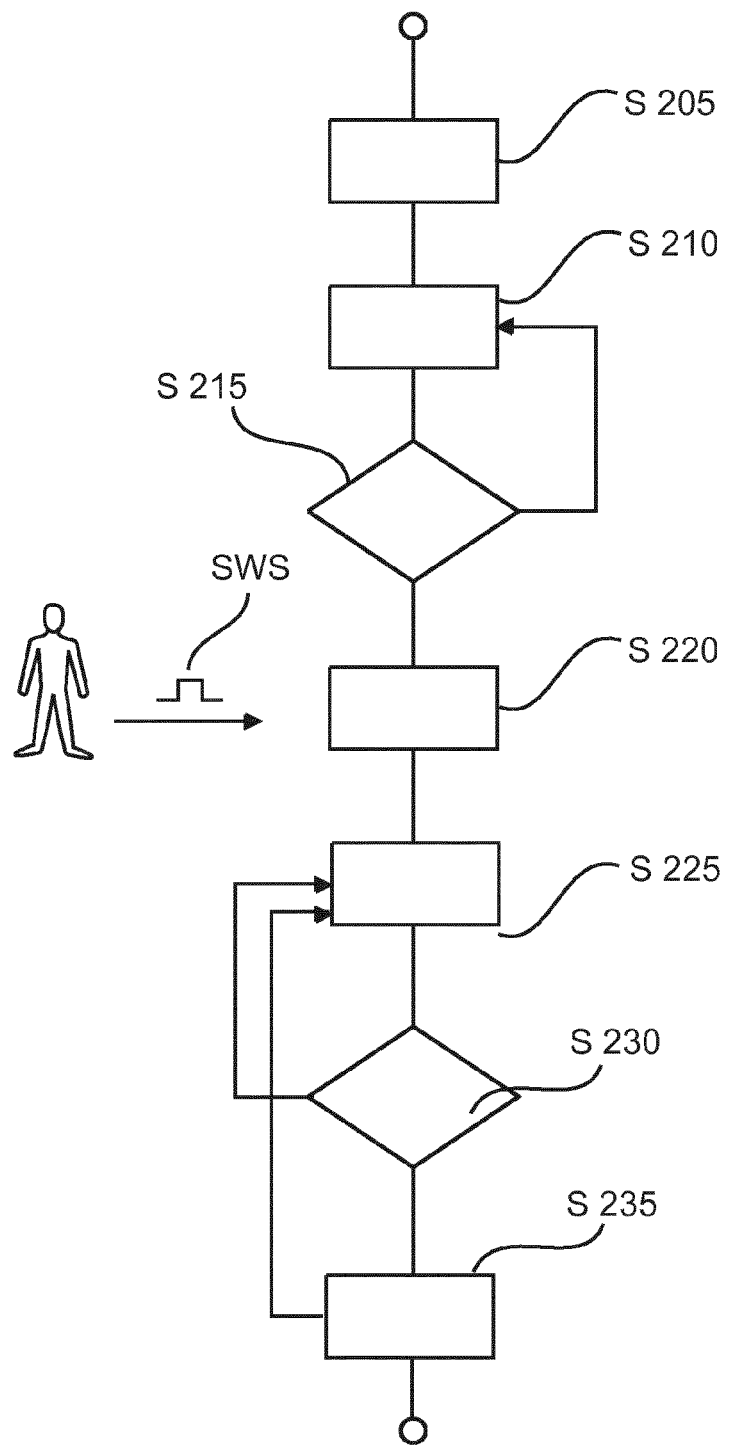
FIG. 2 shows a flow chart of an image processing method.

Reference is now made to the flowchart in FIG. 2, but the basic steps of the image matching algorithm as explained above are summarized.

In step S205, one or more frames Fi of the, for instance, microscopic feed FL are received.

In step S210, matching of image features in a current frame against a template, derived from the first reference image, is attempted.

In step S215, it is decided whether there is a match, and if there is, a switchover from the first mode to a second match mode operation is executed at step S220.

The switchover at step S220 involves exchanging the current template for a new template computed from image features of the matching frame. In one embodiment, the decision on whether there is or is no match is based on a degree of correspondence that is measured by a score, computed from the image features in the frame and that is then compared against a predefined threshold. A match may be considered to have occurred if the image features in the current frame return a score that exceeds the threshold. Otherwise the current frame is considered not to match the reference image template.

Workflow then proceeds in step S225 to attempt matching the new template against subsequent frames of the feed as they are coming in.

Once a further match against said new template is detected at step S230, the newly matching frame is then output at step S235. In one embodiment, outputting includes displaying the newly matching frame. In one embodiment, the displaying includes overlaying a graphical symbol to designate that portion in the matching frame that returned a score exceeding the predefined threshold.

Workflow may then return to step S225 to attempt to find further matches in the incoming stream.

In one embodiment, the switch-over at step S220 may also be triggered by a user issued switching signal SWS. In other words, the switchover in this case is not caused by the image features of the current frame returning a high enough score. In other words, in this case, the score is ignored and the user issued signal SWS enforces the switchover at S220. In one embodiment, a further exchange may occur, but this exchange from the currently held frame-based template to a different likewise frame-based template (derived from a next matching frame) occurs in response to a change in an imaging setting of an imager that supplies the stream of frames. Once a signal has been received that the imaging settings have changed, the frame-template-to-frame-template exchange is carried out as soon as a further frame is found that matches the currently held template.

In one embodiment, it is envisaged that the image processor as proposed herein runs as a software routine on the workstation such as a general computed platform. However in other embodiments the image processor may be arranged as dedicated FPGAs or as hardwired standalone chips. The components of the image processor may be programmed in a suitable scientific computing platform such as Matlab® or Visual Studio®. For instance, the Matlab® suite features an "image processing toolbox".

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus.

The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processing apparatus for use in biology, histology and pathology, the image processing apparatus comprising:
   an input port (IN) for receiving a plurality of image frames from a first imaging procedure and a first image from a second imaging procedure, the first image serving as a first reference template;
   an image matcher (M) switchable between a first mode and a second mode, wherein the matcher attempts matching image frames of the plurality of image frames from the first imaging procedure to the first reference template when the matcher operates in the first mode, and wherein the matcher switches to the second mode when a first matching image frame, determined as an image frame of the plurality of image frames that matches the first reference template according to a first threshold, is found from among the image frames, or when a user issued switch signal is received corresponding to a current image frame of the image frames, and then uses the first matching image frame or the current image frame, respectively, as a second reference template in the second mode instead of the first reference template to attempt matching subsequent image frames of the plurality of image frames to the second reference template; and
   an output port (OUT) for outputting a further matching image frame, determined as an image from the subsequent image frames that matches the second reference template according to a second threshold, found from among the subsequent image frames of the plurality of image frames.

2. The image processing apparatus of claim 1, wherein the attempted matching in the first and second modes is based on attempting to match an image feature as defined in the first or second reference template against an image portion in the image frames and subsequent image frames, respectively.

3. The image processing apparatus of claim 2, wherein the outputting includes displaying on a display unit the image portion of the further matching frame, with a respective graphical overlay outlining the image feature.

4. The image processing apparatus of claim 2, wherein the outputting includes displaying on a display unit the further matching image frame, and not the first matching image frame.

5. The image processing apparatus of claim 1, wherein the second reference template is maintained for one or more further matching attempts until an imaging setting of a first imaging modality used in the first imaging procedure is changed, wherein the matcher, in response to the change, uses another matching image frame as a third reference template to attempt matching additional subsequent image frames of the plurality of image frames to the third reference template instead of the second reference template, and wherein the output port (OUT) outputs a further matching image frame determined as matching the third reference template.

6. The image processing apparatus of claim 1, wherein the first imaging procedure involves using a first imaging modality, and wherein the first imaging modality is a microscope camera system.

7. The image processing apparatus of claim 1, wherein the second imaging procedure involves using a second imaging modality, and wherein the second imaging modality is a pathology slide scanner.

8. The image processing apparatus of claim 1, wherein the plurality of image frames are acquired of one or more histology sections.

9. The image processing apparatus of claim 8, wherein the first image is acquired of a histology section held between a slide and a cover glass, and wherein the plurality of image frames are acquired of a different histology section without cover glass.

10. The image processing apparatus of claim 9, wherein coordinates of the further matching image frame are fed into an MDx apparatus to remove material from the different histology section that corresponds to a region of interest of the first matching image frame.

11. The processing apparatus of claim 10, wherein the plurality of image frames is supplied manually or automatically.

12. The image processing apparatus of claim 8, wherein the histology section and the different histology section are taken from the same specimen.

13. A method of image processing for use in at least one of biology, histology and pathology, the method comprising:
   receiving a stream of image frames from a first imaging procedure;
   in a first mode, attempting matching image frames in the stream of image frames against a first image from a second imaging procedure to find a matching image frame from among the image frames in the stream of image frames, wherein the first image serves as a first reference template;
   when the matching image frame is found, or when a switch signal is received corresponding to a current image frame in the stream of image frames, switching to a second mode;
   in the second mode, using the matching image frame or the current image frame, respectively, as a second reference template, instead of the first reference template, and attempting matching further image frames in the stream of image frames against the second reference template to find a further matching image frame from among the further image frames in the stream of image frames; and
   when the further matching image frame is found, outputting the further matching image frame.

14. A non-transitory computer readable medium, having stored thereon a computer program, executable by a processing unit, to provide image processing in at least one of biology, histology and pathology, the computer readable medium comprising:
   receiving code for receiving a stream of image frames from a first imaging procedure;
   first matching code for attempting to match in a first mode image frames in the stream of image frames against a first image provided from a second imaging procedure, wherein the first image serves as a first reference template;
   switching code for switching to a second mode when a matching image frame is found from among the image frames in the stream of image frames, or when a switch signal is received corresponding to a current image frame in the stream;
   second matching code for attempting to match in the second mode subsequent image frames in the stream of image frames, using the matching image frame or the current image frame, respectively, as a second reference template instead of the first reference template; and output code for outputting a further matching image frame when the further matching image frame is found from among the subsequent image frames in the stream of image frames.

* * * * *